(12) United States Patent
Braumann et al.

(10) Patent No.: US 11,680,929 B2
(45) Date of Patent: Jun. 20, 2023

(54) DEAD VOLUME-FREE FRACTION COLLECTION APPARATUS

(71) Applicant: Bruker BioSpin GmbH, Rheinstetten (DE)

(72) Inventors: Ernst Ulrich Braumann, Ettlingen (DE); Martin Hofmann, Bad Herrenalb (DE)

(73) Assignee: Bruker BioSpin GmbH, Rheinstetten (DE)

( * ) Notice: Subject to any disclaimer, the term of this patent is extended or adjusted under 35 U.S.C. 154(b) by 480 days.

(21) Appl. No.: 16/850,238

(22) Filed: Apr. 16, 2020

(65) Prior Publication Data
US 2020/0333302 A1 Oct. 22, 2020

(30) Foreign Application Priority Data
Apr. 16, 2019 (DE) ...................... 10 2019 205 509.9

(51) Int. Cl.
*G01N 30/84* (2006.01)
*B01D 15/10* (2006.01)
*B01L 3/02* (2006.01)

(52) U.S. Cl.
CPC ............. *G01N 30/84* (2013.01); *B01D 15/10* (2013.01); *B01L 3/0241* (2013.01); *B01L 2300/0838* (2013.01); *B01L 2300/0867* (2013.01)

(58) Field of Classification Search
CPC ........... G01N 30/84; G01N 2030/8417; G01N 2030/382; G01N 2030/8441; G01N 30/20; G01N 30/24; G01N 30/38; G01N 30/74; G01N 30/80; G01N 30/82; G01N 35/1004; B01L 2300/0838; B01L 2300/0867;
(Continued)

(56) References Cited

U.S. PATENT DOCUMENTS

| 6,704,880 B2 | 3/2004 | Dai et al. |
| 2002/0011276 A1 | 1/2002 | Sander |

(Continued)

OTHER PUBLICATIONS

Manual, Foxy® R1 and Foxy® R2, Fraction Collectors, Teledyne Isco, Revision H, Jun. 21, 2016, 138 pages.
(Continued)

*Primary Examiner* — Sharon Pregler
(74) *Attorney, Agent, or Firm* — Edell, Shapiro & Finnan, LLC

(57) ABSTRACT

An apparatus for collecting liquid fractions from a separation/reaction apparatus (1). A capillary (2) guides an extracted liquid fraction to a branching unit (3), a collection arrangement (4) carries a plurality of target vessels (5) receiving the liquid fraction from the capillary and a fluid line (6) is flow-connected to a fluid pump (7) and opens into the branching unit. The capillary and the fluid line each have outlet openings in the direct vicinity of one another at their end facing a target vessel such that liquid emerging from the outlet opening (2') of the capillary transitions into the outlet opening (6') of the fluid line. This precludes back mixing with earlier/later liquid fractions, precludes uncontrolled dripping of sample substance at the transfer point, speeds displacement of the target vessels in the collection arrangement, facilitates automation of the fraction processing procedure, and results in a more compact fraction collection apparatus.

22 Claims, 10 Drawing Sheets

(58) Field of Classification Search
CPC ............... B01L 3/0241; B01L 2400/02; B01L 2400/0487; B01L 2400/0622; B01D 15/08; B01D 15/10
See application file for complete search history.

(56) References Cited

U.S. PATENT DOCUMENTS

| | | |
|---|---|---|
| 2002/0088946 A1 | 7/2002 | Hofmann et al. |
| 2005/0158215 A1* | 7/2005 | Iwata .................... B01L 3/0241 210/198.2 |
| 2018/0136174 A1 | 5/2018 | Nakamura et al. |

OTHER PUBLICATIONS

Brochure "Foxy Jr. Fraction Collector", Teledyne Isco, Sep. 2, 2005, 180 pages.

* cited by examiner

DEAD VOLUME-FREE FRACTION COLLECTION APPARATUS

CROSS REFERENCE TO RELATED APPLICATIONS

This application claims foreign priority under 35 U.S.C. § 119(a)-(d) to German Application No. 10 2019 205 509.9 filed on Apr. 16, 2019, the entire contents of which are hereby incorporated into the present application by reference.

FIELD OF INVENTION

The invention relates to a fraction collection apparatus for collecting liquid fractions from a separation or reaction apparatus, comprising a capillary, which can guide a liquid fraction from the separation or reaction apparatus to a branching unit, and comprising a collection arrangement, which carries a plurality of target vessels for receiving the liquid fraction from the capillary, wherein a fluid line opens into the branching unit, which is fluidically connected to a fluid pump, wherein the capillary and the liquid line each have an outlet opening at their end facing a target vessel, and wherein the outlet openings are arranged in direct proximity to one another in such a way that liquid emerging from the outlet opening of the capillary can pass into the outlet opening of the fluid line.

BACKGROUND

Such a fraction collection device is known from US 2005/0158215 A1 (=reference [0]).

Similar fraction collection apparatus are commercially available and are known, for instance, from the handbook "Foxy® R1 and Foxy® R2, Fraction Collectors", Teledyne Isco, Revision H, Jun. 21, 2016 (=citation [1]).

BACKGROUND OF THE INVENTION

In general, the present invention relates to the field of further processing—such as collecting, returning, storing, measuring or disposing—of liquid fractions from a separation or reaction apparatus. These fractions can originate from separation columns, or else from reaction containers with fractionated sample extraction.

By way of example, the further processing can comprise the collection of eluate fractions from a device for liquid chromatography, or else the regular extraction and examination of liquid fractions from continuously monitored chemical reactions, wherein the examinations can be implemented with analytical measurements, in particular by suing magnetic resonance spectroscopy.

NMR (nuclear magnetic resonance) spectroscopy is a widespread measurement process which can be used to analyze chemical compounds. Within the scope of NMR spectroscopy, a sample to be measured is usually placed into a sample tube in a sample probe, which is measured in the NMR spectrometer.

The goal of chemical reaction monitoring essentially lies in optimizing reaction parameters (temperature, pressure, solvent, catalyst, . . . ) with the object of shifting the reaction equilibrium to the product side and/or suppressing aberrant reactions. Thus, sample fractions have to be regularly extracted in order to obtain permanent reaction monitoring by using NMR spectroscopy.

Having to collect fractions from the separation for further processing steps may be necessary, not only for LC-NMR, but also in chromatography in general—be it that the obtained fractions are evaporated and then re-dissolved in defined volume in order to subsequently be transferred into NMR tubes or be it that further spectroscopic processes must be enabled for analysis purposes.

Depending on the sample, these fractions have different volumes and are not always separated 100% from adjacent samples. However, back mixing with a preceding or subsequent fraction should be avoided/minimized at all costs so that a fraction that is as pure as possible is obtained. Quick and exact activation and deactivation of the fraction procedure and changing the vessel position without mixing with the adjacent fraction would therefore be required.

As a rule, conventional XY(Z) fraction collectors have an XY work field, on which the collection vessels (or target vessels) are made available, and an XY-movable arm, on which a so-called 3/2-way valve is usually assembled as closely to the transfer point as possible. Optionally, the transfer cannula can also be positioned in the Z-direction in order to penetrate into the target vessel. That is to say, the 3/2-way valve has three connectors and two positions in order to facilitate the fraction waste and fraction collection functions, specifically a fraction valve (IN), a waste valve (OUT) and a fraction collector valve (OUT).

For structural reasons, such valves always have an internal volume which may be larger or smaller, depending on design. Additionally, the volume between the valve connector and the transfer point (drip point) over the collection vessel is a further volume that has to be taken into account when calculating the internal void volume. If the intention is to minimize, or even avoid, back mixing of the liquid fraction, this residual volume between the valve and transfer point must be discarded in a waste position of the transfer point before a further fraction can be collected.

Some fraction collectors also have a specific XY waste position for their transfer point in order that the dead volume between the valve and the transfer point can always be flushed with the current fraction so that there is as little back mixing with a previous sample as possible. However, the movement of the transfer point to the waste position takes time and is not beneficial if many fractions follow one another in quick succession.

In chromatography, the eluted substances are contained in very different amounts and therefore elute for different amounts of time. Not all substances are base line-separated and elute directly in succession. Some substances also partly overlap. If the intention is to collect virtually 100% of a substance, a system with as little internal dead volume as possible is required in order that the desired fraction can be collected precisely and with little mixing with the preceding or successive sample.

Further dripping at the transfer point should also be avoided within the scope of a vessel change (XY(Z) movement of the cannula) during a fractionating process in order that no sample drips between the two positions. As a rule, this is brought about by brief switching of the 3/2-way valve to the waste position and, following the XY(Z) positioning, back to the fraction collection. However, a fast reaction is a precondition for this. Nevertheless, the possible loss of parts of a fraction that are already located in the valve cannot be avoided. In the case of a small sample volume, this can already lead to significant loss of sample mass.

XY fraction collectors (Foxy Jr./JASCO—fixed Z-position) constructed according to a conventional pattern have been used for years in LC-NMR (liquid chromatography NMR) and LC-SPE-NMR (liquid chromatography solid phase extraction NMR) and all of the above-described disadvantages have been accepted in the process.

However, it is no longer possible to use this fraction collector nowadays since this system reacts far too slowly for the chromatography in LC-NMR, which has been substantially accelerated in the meantime, and since an internal volume thereof is too large.

US 2002/0011276 A1 (=citation [2]) describes a gas-buffered pipetting system that dispenses small liquid volumes. The system comprises a pipetting volume, a micro pump and a gas store, and also a valve. Negative pressure or positive pressure is built up in the gas store with the micro pump. When the pipette is connected via the valve, the corresponding volume is received by or dispensed by the pipette. Additionally, there is dynamic closed-loop control of the pressure with a pressure sensor in the connecting channel between the gas store and the pipette. Thus, pipetting is carried out off-line in this case. There is no fractionating of analytes in a continuous flow. In this respect, the known system more likely represents a "micro auto pipette" with extended metering functions. It is operated at positive/negative gas pressure and more likely intended for metering and/or mixing in the sub-µl volume range. The two hollow chambers in the cannula (needle) should effect the uptake of a plurality of liquids for mixing the same.

The system described in US 2002/0088946 A1 (=citation [3]) has a liquid chromatography separation unit and a target detector unit, which comprises an NMR detector. The apparatus comprises a column carrier which carries a plurality of trapping columns, and, further, an inlet capillary for supplying the chromatography flow from the LC separation unit or the chromatography detection unit to one of the trapping columns, which are carried by the column carrier, and an outlet capillary, which leads away from the trapping columns, which are carried by the column carrier. Here, chromatographic analyte fractions are captured on SPE (solid phase extraction) cartridges in a closed circuit. However, even if the cartridges were to be replaced by open vessels, there still would be the internal dead volume from the valve to the transfer point, with all of the above-described disadvantages of a known fraction collector.

U.S. Pat. No. 6,704,880 A (=citation [4]) describes a sample analyzer with a system for collecting liquid fractions. Here, fractions from this flow path are separated into a further capillary, which is placed over a collection vessel, using pressurized gas pulses. This known system does not envisage fractionation of relatively large portions but only small droplet volumes. Once again, a dead space is created by the further capillary. In the ideal case, the pressurized air should operate like a 3/2-way valve and completely interrupt the flow in the "waste" direction in order to divert the substance coming from the chromatography into the transfer capillary. However, this can hardly have a 100% success rate.

Once the desired fraction has passed the transfer point in the known system it is irretrievably lost. In particular, this can always happen during the mechanical change from one vessel to the next, which will always take approximately 1 to 2 seconds.

US 2018/0136174 A1 (=reference [5]) describes a preparative chromatograph for collecting target components in a sample separated in time in a column of a chromatograph in corresponding preparative containers, equipped with a detection unit with a flow cell housed in a housing and a detector for detecting a component passing through the flow cell; with a first tube connecting the column and an inlet end of the flow cell; a flow path switching unit housed in the housing and configured to selectively allow components that have passed through the flow cell to flow through a preparative flow path connected to the preparative containers or to a waste liquid flow path; and a second tube housed in the housing and connecting an outlet end of the flow cell and the flow path switching unit.

However, a disadvantage in all previously known generic fraction collection apparatuses is that each system has an internal dead volume which unavoidably arises in the lines and the valves during operation. However, this dead volume necessarily falsifies the respectively collected liquid fraction on account of unavoidable back mixing.

Uncontrolled dripping from the end of the cannula during the mechanical XYZ-displacement of the fraction collector arm & cannula represents a further problem, as a result of which—possibly rare and valuable or else chemically aggressive and/or poisonous—sample liquid is lost.

Finally, the previously known systems require a relatively fast temporal reaction for the position change of the respective target vessel in the collection arrangement to be approached so that the driven target vessel can even be filled to a sufficient extent—in fact, as completely as possible—with the liquid of the fraction to be transferred at the transfer time.

SUMMARY

By contrast, the present invention has as an object—a relatively demanding and complex object if considered in detail—of facilitating processing of liquid fractions from the separation or reaction apparatus. Related objects include providing a processing that is largely automatable and also optimizable in targeted fashion in respect of selected process parameters, using uncomplicated, easily acquirable technical solutions in a fraction collection apparatus of the type set forth at the outset, wherein the above-described disadvantages of the known systems are avoided. In particular, back mixing with previously taken liquid fractions and liquid fractions to be taken at a later stage and also an uncontrolled emergence of sample substance at the transfer point should be excluded to the greatest possible extent. Moreover, the very quick mechanical reaction—previously required—should no longer be necessary in respect of the displacement of the target vessels in the collection arrangement prior to the transfer of the current liquid fraction. Finally, the processing procedure for the taken fraction should be able to be designed in software-controlled, automated and highly reproducible fashion, wherein the fraction collection apparatus moreover should have a structure that is as spatially compact as possible.

The present invention addresses these objects in a both surprisingly simple and effective manner by virtue of a fluid line, which is flow-connected to a fluid pump, opening into the branching unit and by virtue of the capillary and the fluid line each having an outlet opening at their end facing a target vessel, the outlet openings being disposed in the direct vicinity of one another in such a way that liquid emerging from the outlet opening of the capillary transitions into the outlet opening of the fluid line.

Thus, the dead volume—always present previously—in the fraction collection apparatus is now completely avoided. According to the invention, an outlet opening of the fluid line, which is flow-connected to a fluid pump, is disposed for this purpose directly at the outlet opening of the capillary through which the liquid fraction currently taken from the separation or reaction apparatus should be transferred to a provided target vessel of the collection arrangement. Thus, this allows complete or partial aspiration of the taken liquid fraction into the fluid line, or else a transfer thereof to the target vessel, to be undertaken in targeted and precise fashion at the end of the capillary.

This can reliably prevent unwanted mixing of parts of a fraction taken earlier with a later fraction. Moreover, uncontrolled dripping of parts of the taken liquid fraction during the transfer at the end of the capillary is avoided. Finally, it is also no longer necessary to be particularly speedy when positioning the target vessel in the collector.

Compared to the system known from citation [4], the partial fraction—otherwise lost—can also be retrieved with the aid of the present invention. To this end, the aspiration pump is switched to "dispense" and the volume that has been aspirated during the vessel change in order to stop dripping during the XYZ-movement is output again over the new collection vessel.

Preferred Embodiments and Developments of the Invention

A class of advantageous embodiments of the fraction collection apparatus according to the invention is characterized in that the fluid line and the capillary extend in parallel from a flow point of view along a common section and the common section of the capillary and fluid line preferably extends into the branching unit. Here, the fluid line and the capillary can also extend in parallel from a geometrical point of view along the common section. Alternatively, the liquid line can envelope the capillary along the common section, preferably in concentric fashion.

The use of a concentric "double cannula (needle)" in an XYZ fraction collector in which the inner cannula is fed by the separation or reaction apparatus and the surrounding, slightly larger cannula is connected to the fluid pump creates, as it were, a valve function which, in the case of a correct execution, is without a dead volume and facilitates timely, back mixing-free switching since, of course, there no longer is a dead volume, neither a valve nor a separate supply to the transfer point. The inner cannula is guided to the tip of the outer cannula. The flow rate and the internal volume of the separation or reaction apparatus up to the tip of the inner cannula are known. As a result, the temporal requirement for the transport of a sample from identification of same to the dispensing point can be calculated easily and exactly.

Embodiments of the fraction collection apparatus according to the invention, which are distinguished in that the end section of the common section of capillary and fluid line facing the target vessel of the collection arrangement opens into a—single—cannula are particularly preferred. This yields a compact structure, and so the capillary can also protrude into deeper sample vessels with a small opening. This embodiment has particular advantages in conjunction with an XYZ fraction collector.

The outer line of the double cannula can be beveled at the tip in order to facilitate the function of a septum piercing needle. This allows taken liquid fractions also to be injected into vessels sealed by a septum, with the general requirements for clean sample preparation not being impaired. If easily volatile fractions or fractions that tend to react in open vessels are present, vessels sealed by septum are advantageous.

In advantageous developments of these embodiments, the cannula can be mechanically coupled via a coupling piece at a part of the common section of the connected capillary and fluid line that faces away from the branching unit. This allows the capillary and the fluid line to be brought together in a fluid-tight fashion in the branching unit.

Embodiments of the invention in which the branching unit comprises a distributor piece, in particular a T-piece or a Y-piece, with at least three inlet openings, a first segment of the capillary coming from the separation or reaction apparatus opening into the first inlet opening, a second segment leading to the XY or XYZ collection arrangement and consisting of the fluid line and the capillary opening into the second inlet opening and a section of the fluid line leading to the fluid pump opening into the third inlet opening, are also particularly preferred. This facilitates a space-saving, small design and hence integration in many commercially available fraction collectors or XYZ preparation robots.

Further advantageous embodiments of the invention are characterized in that a waste collection vessel is present for collecting discarded liquid fractions, which can be guided out of the branching unit via the fluid line for disposal purposes, and in that a first switching valve, in particular a 3/2-way valve, is disposed in the fluid line between the fluid pump and the waste collection vessel, an inlet opening of said first switching valve being connected to the fluid pump and the fluid pump being able to be selectively connected to the waste collection vessel or to a container with system liquid, in particular for rinsing and/or for preparing liquid samples, via the outlet openings of said first switching valve. By way of example, these options can be used for rinsing the cannula and/or for additionally preparing liquid samples in the target vessel of the collection arrangement.

Additionally, embodiments of the invention in which a further switching valve, which can be configured as a 3/2-way valve in particular, is disposed in the fluid line between the fluid pump and the branching unit are particularly preferred. An inlet opening of this further switching valve is connected to the branching unit, the branching unit being able to be selectively connected to the fluid pump or to a gas container with gas, preferably dry inert gas, in particular for blowing clear, purging and/or drying lines and target vessels of the fraction collection apparatus, via the outlet openings of said further switching valve. Heating the gas can additionally accelerate the evaporation procedure of remains of the liquid fraction guided through last, but also of cleaning liquid, for example. Particularly when collecting fractions of NMR samples, it is possible to evaporate the protonated solvent used either for LC or for the chemical reaction in the target vessel in order to replace it by an equivalent deuterated solvent prior to the NMR measurement. Deuterated solvents are substantially more expensive than protonated solvents and are therefore usually not used in chromatography or wet-chemical reactions. By contrast, the signal of the protons in the solvent would be superimposed on the signal of the target molecules during the NMR measurement. By recording the sample in purely deuterated solvents, the signal-to-noise ratio during the NMR measurement is substantially improved (by a factor of approximately 2-3), and consequently even relatively small signals become substantially more clearly visible.

Embodiments of the fraction collection apparatus according to the invention in which a delivery pump is disposed at the separation or reaction apparatus, said delivery pump conveying the liquid in the capillary at a flow rate v2, are also advantageous. By way of example, this delivery pump can be a chromatography pump, which is disposed upstream of the separation column, or else a pump for taking reaction liquid, which is disposed downstream of the reaction vessel. The flow rates of fluid pump and delivery pump, which are matched to one another, ensure a particularly good operation of the apparatus according to the invention.

In alternative or complementary embodiments of the fraction collection apparatus according to the invention, the fluid pump is subject to such closed-loop control that the flow rate v1 in the fluid line is at least equal to, and preferably greater than, the flow rate v2 in the capillary. This closed-loop control ensures that the fluid pump gathers all the liquid emerging from the capillary in the outlet opening the fluid line during aspiration operation. As a precaution, the flow rate of the pump is chosen to be approximately 1-2% above the flow rate of the capillary.

Further advantageous embodiments of the invention are distinguished in that an open-loop or closed-loop control apparatus is present, via which the fluid pump is, in particular electronically, drivable, and in that the duration of the on and off cycles and the flow rate v1 are subjectable to closed-loop control. Preferably there can also be a switch from aspiration operation to pressure operation. Using appropriate intelligent software, it is possible to create 100% fractions despite a position change and the fraction pause connected therewith by virtue of dispensing the partial fraction volumes aspirated in the meantime into the new target vessel together with the directly following fraction.

Developments in which the open-loop and closed-loop control apparatus is embodied in such a way for electrical driving of the pump devices and electrical driving of the valve devices that it facilitates an independent flow and volume control, in particular independent driving of the fluid pump and the delivery pump, in particular on the basis of specifiable parameters, for instance the progression of a reaction in a reaction apparatus, are very particularly preferred.

Developments in which the open-loop and closed-loop control apparatus is configured in such a way for electrical driving of the pump devices and for electrical driving of the valve devices that it facilitates a time-controlled and/or a volume-controlled closed-loop control of the valve devices and/or the pump devices on the basis of the progression of a reaction in the reaction apparatus are likewise preferred.

Further advantageous embodiments are characterized in that the parts of the pump devices and the valve devices that are wetted with taken liquid and the entire liquid path of this liquid are constructed from chemically inert materials, in particular glass, polytetrafluoroethylene, polychlorotrifluoroethylene, ethylene tetrafluoroethylene. This is because the manufacturer of a fraction collection apparatus according to the invention does not know in advance what reactions will take place in the arrangement at their customers and the type of chemicals with which the system could come into contact. However, they naturally would like to cover a field of applications that is as wide as possible. The taken liquid fractions can be of aqueous nature, e.g., if living organisms are examined; however, reactions under extreme pH and/or with toxic substances are also conceivable. These reactions can occur under extreme temperature conditions or use is made of radical, corrosive reagents such as chlorofluorocarbons or other organic solvents, which react with many plastics and metals.

Therefore, only those materials that have sufficient resistance against as many chemicals used in the laboratory as possible should be selected for the wetted contact region.

A further preferred embodiment of the fraction collection apparatus according to the invention is distinguished in that the pump devices and the valve devices and the entire liquid path of the taken liquid fractions are constructed from materials that can be used in an operational temperature range from −50° C. to +150° C., preferably from −20° C. to +100° C. This facilitates the practical use of the invention in virtually all conceivable applications.

The collection arrangement of the fraction collection apparatus according to the invention may comprise a stage that is displaceable in a horizontal plane or in space, in particular an XYZ stage. However, instead of using such a platform that is displaceable in XYZ, the cannula can also be placed in the XYZ direction over/in the collection vessel. This functionality is not delimiting or even precluding; instead, it generally emerges automatically if the intention is to fractionate into more than one target vessel.

Fields of application of the fraction collection apparatus according to the invention, in which the separation or reaction apparatus comprises a liquid chromatography device with a separation column and a detector, the liquid fraction being an eluate fraction, are very particularly preferred. In conjunction with LC, the dead volume-free fraction collection apparatus according to the invention has very particular advantages since the path and hence the volume of the capillary from the detector to the outlet opening are known. With the aid of the flow speed, which is set by the open-loop and closed-loop control apparatus on the delivery pump, it is possible to precisely determine the time that a desired fraction from the LC, which is identified by the detector, requires to reach the outlet opening. With the aid of the XYZ-displaceable platform, precisely the identified fraction can be collected in a certain target vessel.

Furthermore, fractions that lie very closely together, the peaks of which intersect on the detector display, can be collected separately in the same way. Using conventional processes, a mixture of the two fractions is virtually unavoidable on account of the dead volume in the valve and capillary.

The scope of the present invention also includes a system comprising
  a separation or reaction apparatus, preferably a liquid chromatography device with a separation column, and
  a fraction collection apparatus having the above-described features according to the invention for collecting liquid fractions from the separation or reaction apparatus.

Moreover, the scope of the present invention includes the use of a system with the above-described features according to the invention, for carrying out liquid chromatography or for the reaction-monitoring of a chemical reaction using NMR spectroscopy.

Finally, the scope of the present invention also includes a method for operating a fraction collection apparatus of the above-described inventive type, which method is characterized by the following steps:
a) supplying a liquid fraction via the capillary at a known flow rate v2,
b) positioning the cannula over/in the target with simultaneous aspiration with the fluid pump through the fluid line,
c) stopping the fluid pump and collecting the liquid fraction in the target vessel over a period of time T1,
d) starting the fluid pump and aspirating the liquid fraction into the fluid line for changing the position of the cannula into the subsequent target vessel over a period of time T2,
e) repeating steps c) and d) until termination.

The flow speed is set by a second pump, generally the above-described delivery pump. T1 is the time during which the fraction is collected. Knowledge of the flow rate in the capillary allows exact determination of the amount of collected liquid fraction. T2 is the period of time during which the XY sampler changes its position. The fraction collection using the fraction collection apparatus according to the invention is dead volume-free, in particular; this is because the arrival of a peak at the end of the capillary can be exactly calculated in advance from the interplay of flow rate, capillary volume and time.

In a preferred method variant, in a step c'), the fluid pump releases the partial fraction aspirated in the preceding step d) to the target vessel within the scope of pressure operation. Consequently, no loss fraction is present and the taken liquid volume is collected quantitatively. Preferably, this step c') occurs at the same time as the step c). This is because the period of time T1 shortens by T1-T2 in order to collect the same volume.

In an alternative or complementary variant of the method according to the invention, the separation or reaction apparatus is a liquid chromatography device with a separation column and a downstream detector and the volume V in the capillary between the detector and the end section of the capillary facing the target vessel of the collection arrangement is known and the fluid pump is stopped as per partial step c) with a time offset by a period of time T3, T3 being the time during which the eluate passes the volume V. An advantage here is that precisely the liquid fractions that are captured by the detector are in fact also collected. Particularly in the case of fractions that lie very close together, this can achieve a clear and clean separation since no dead volume is present and the volume V is known. The detector preferably transmits a signal to the control apparatus, which then drives the fluid pump accordingly at the right time.

Further advantages of the invention emerge from the description and the drawing. Likewise, the features specified above and the features yet to be explained below may find use according to the invention, respectively individually on their own or together in any combination. The shown and described embodiments should not be construed as a complete list; instead, they are of exemplary nature for explaining the invention.

BRIEF DESCRIPTION OF THE DRAWINGS

The invention is depicted in the drawing and will be explained in more detail on the basis of exemplary embodiments.

In the Figures.

DETAILED DESCRIPTION

The present invention considers a specially modified fraction collection apparatus for collecting liquid fractions from a separation or reaction apparatus 1. By way of example, the separation or reaction apparatus 1 can comprise a liquid chromatography device with a separation column, or else, for instance, a reactor for chemical reactions that progress in controlled fashion.

Figure 2A:
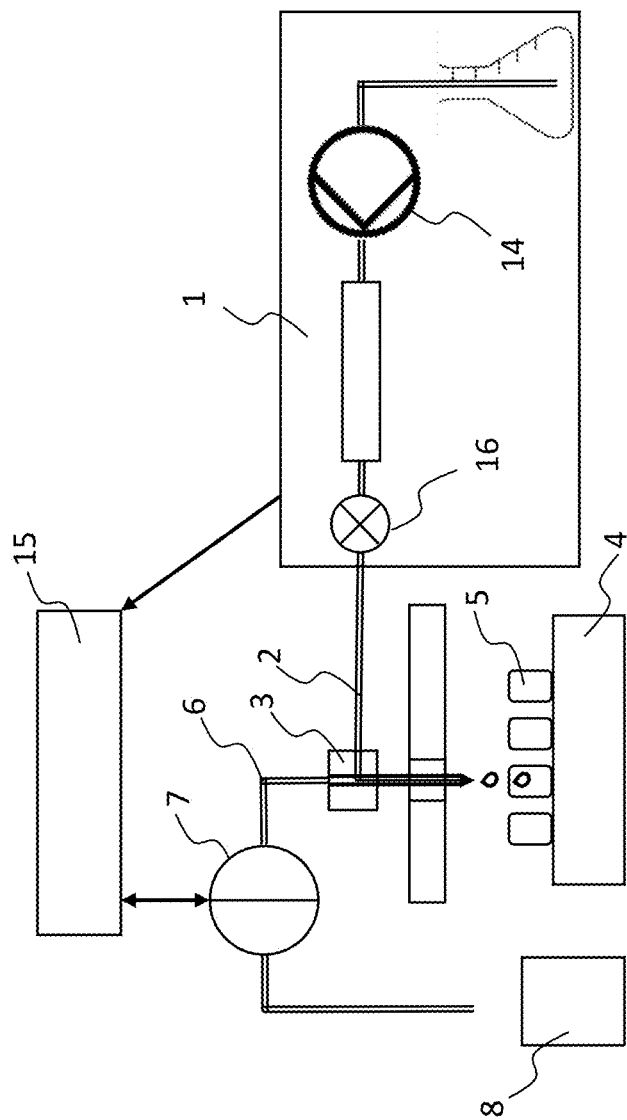
FIG. 2A shows a system comprising a fraction collection apparatus according to FIG. 1 and comprising a separation or reaction apparatus in a first operating state, with a stopped fluid pump for transferring the liquid fraction taken with the capillary to a target vessel of a collection arrangement.
Figure 2B:
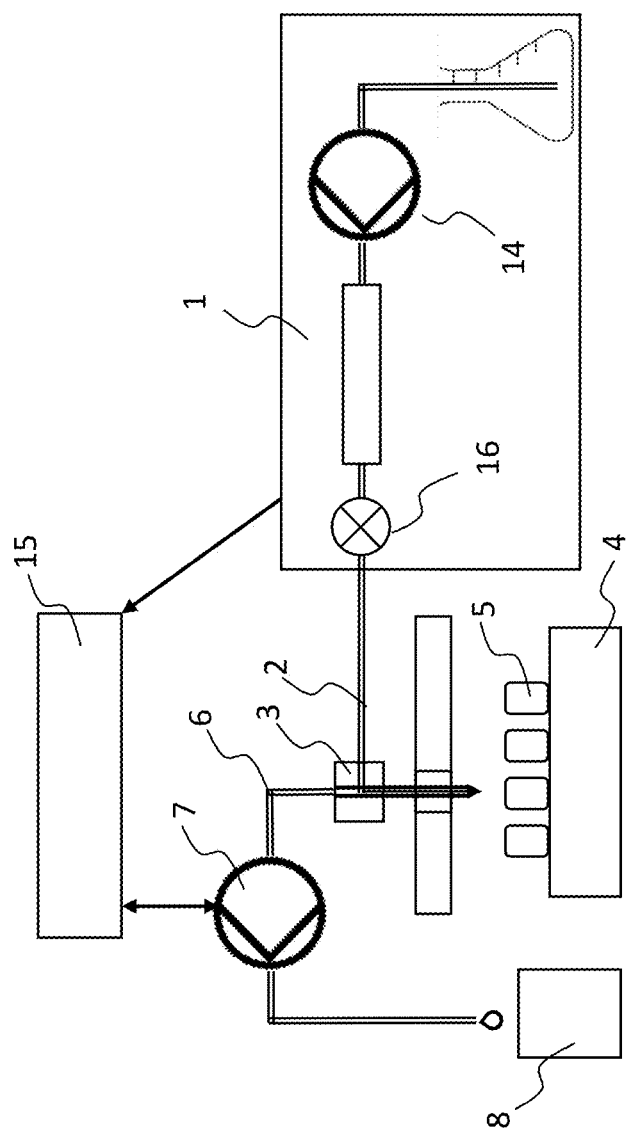
FIG. 2B shows the system according to FIG. 2A in a second operating state, with a running fluid pump for transferring the liquid situated in the capillary to a waste collection vessel via the fluid line.
Figure 3A:
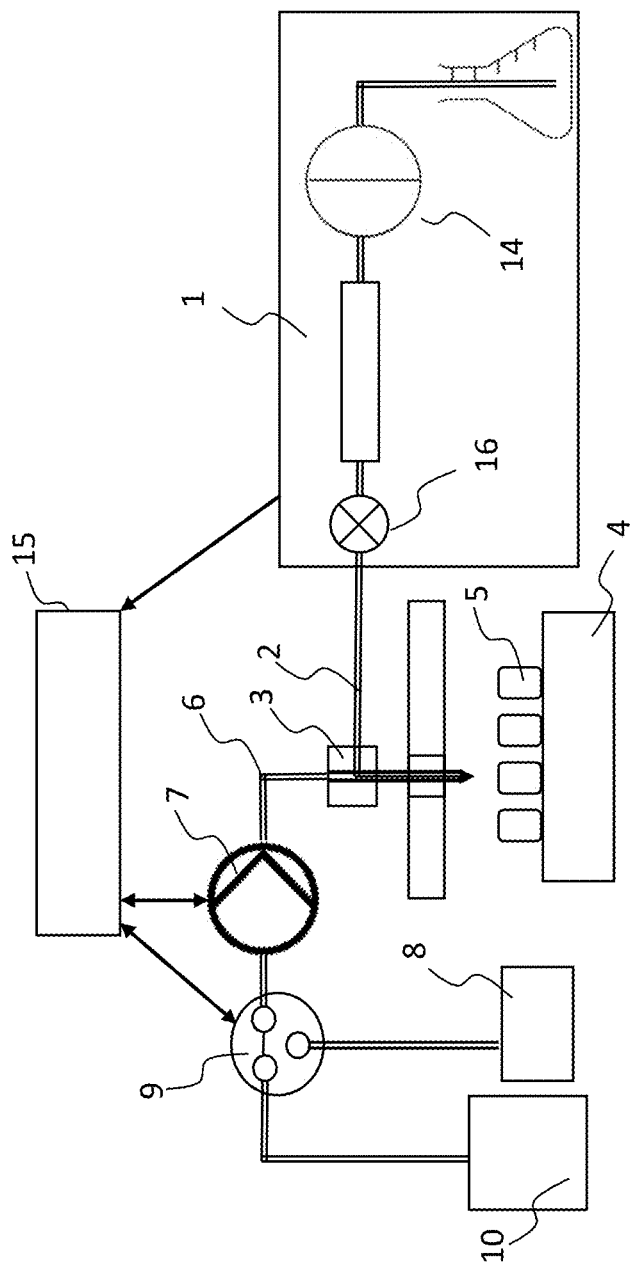
FIG. 3A shows a schematic illustration of an extended embodiment comprising a first switching valve between the fluid pump and the waste collection vessel and a container with system liquid in a third operating state with a running fluid pump for rinsing the fluid line.
Figure 3B:
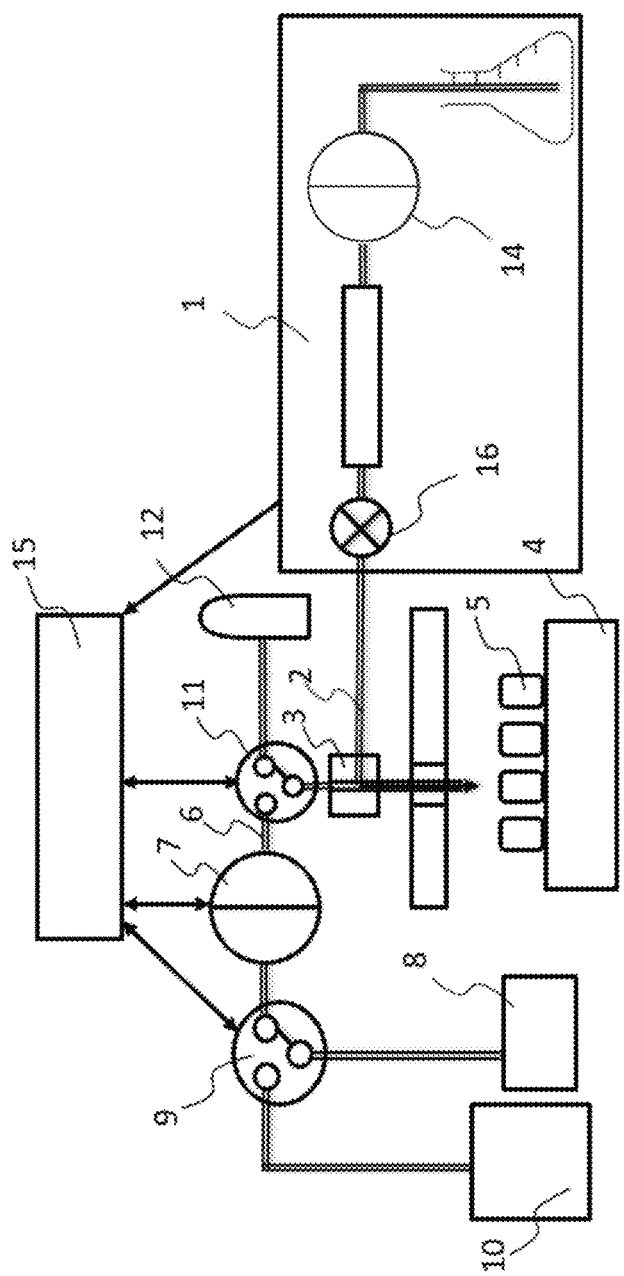
FIG. 3B shows an extended embodiment as in FIG. 3A, but additionally comprising a further switching valve between the fluid pump and the branching unit and comprising a gas container, in a fourth operating state with a stationary fluid pump and an opened gas container for blowing clear the fluid line.
Figure 4:
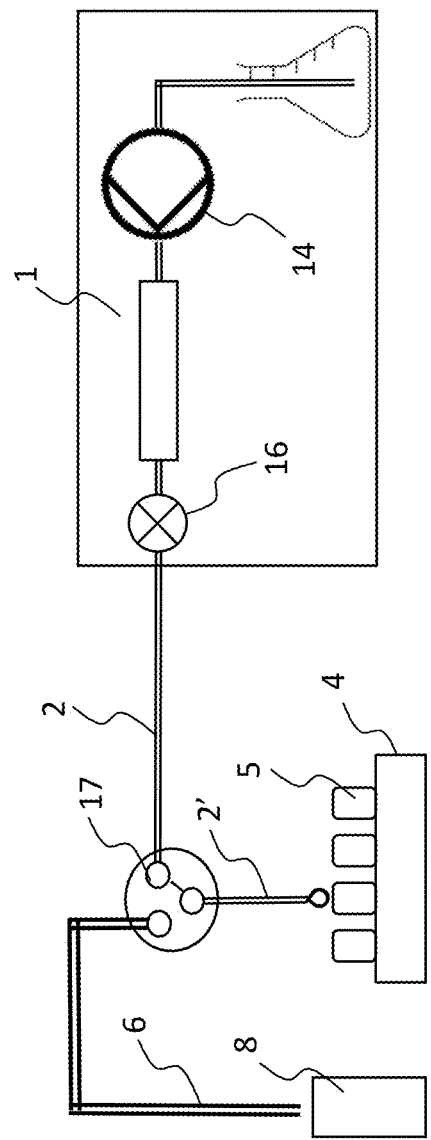
FIG. 4 shows a schematic illustration of a system comprising a fraction collection apparatus according to the prior art, as per citation [1]

FIGS. 1 to 3B and 5 and 6 in the drawing each show details of preferred embodiments of the fraction collection apparatus according to the invention in a schematic view, while a generic system according to the prior art as per citation [1] is illustrated in FIG. 4.

The fraction collection apparatus comprises a capillary 2, which guides a liquid fraction from the separation or reaction apparatus 1 to a branching unit 3, and a collection arrangement 4, which carries a plurality of target vessels 5 for receiving the liquid fraction from the capillary 2. A taken liquid fraction can be emptied into one of these target vessels 5 via the outlet opening 2' of the capillary 2, for storage purposes and optional further processing. However, the taken fraction can also be guided to a waste collection vessel 8 via the branching unit 3 and a fluid line 6.

In the fraction collector as per the prior art illustrated in FIG. 4, the separation or reaction apparatus 1 usually also contains a delivery pump 14 for conveying the liquid fraction from a chromatography device or reaction vessel into the capillary 2. Moreover, a detector 16 is usually also present, said detector indicating whether a liquid fraction currently contains a target molecule. Hence, further processing of this fraction, which is often automated as well, can then be driven in the fraction collection apparatus via a valve 17.

This known fraction collection apparatus always contains a certain dead volume. In this case, this is the volume in the line between the 3/2-way valve 17 and the cannula outlet 2' and the internal volume of the valve itself. This 3/2-way valve 17 allows the taken liquid fraction to be steered either into the collection arrangement 4, like in the operating state shown in FIG. 4, or into the waste collection vessel 8 for disposal purposes.

The fraction collection apparatus according to the invention fundamentally differs from this prior art predominantly in that the fluid line 6 opening into the branching unit 3 is flow-connected to a fluid pump 7 and in that the capillary and the fluid line 6 have outlet openings 2', 6' at their end facing a target vessel 5, said outlet openings being disposed in the direct vicinity of one another such that liquid emerging from the outlet opening 2' of the capillary 2 transitions into the outlet opening 6' of the fluid line 6. This reliably avoids a detrimental dead volume, which would necessarily lead to undefined intermediate fractions between successive liquid fractions, in the arrangement.

Figure 1:
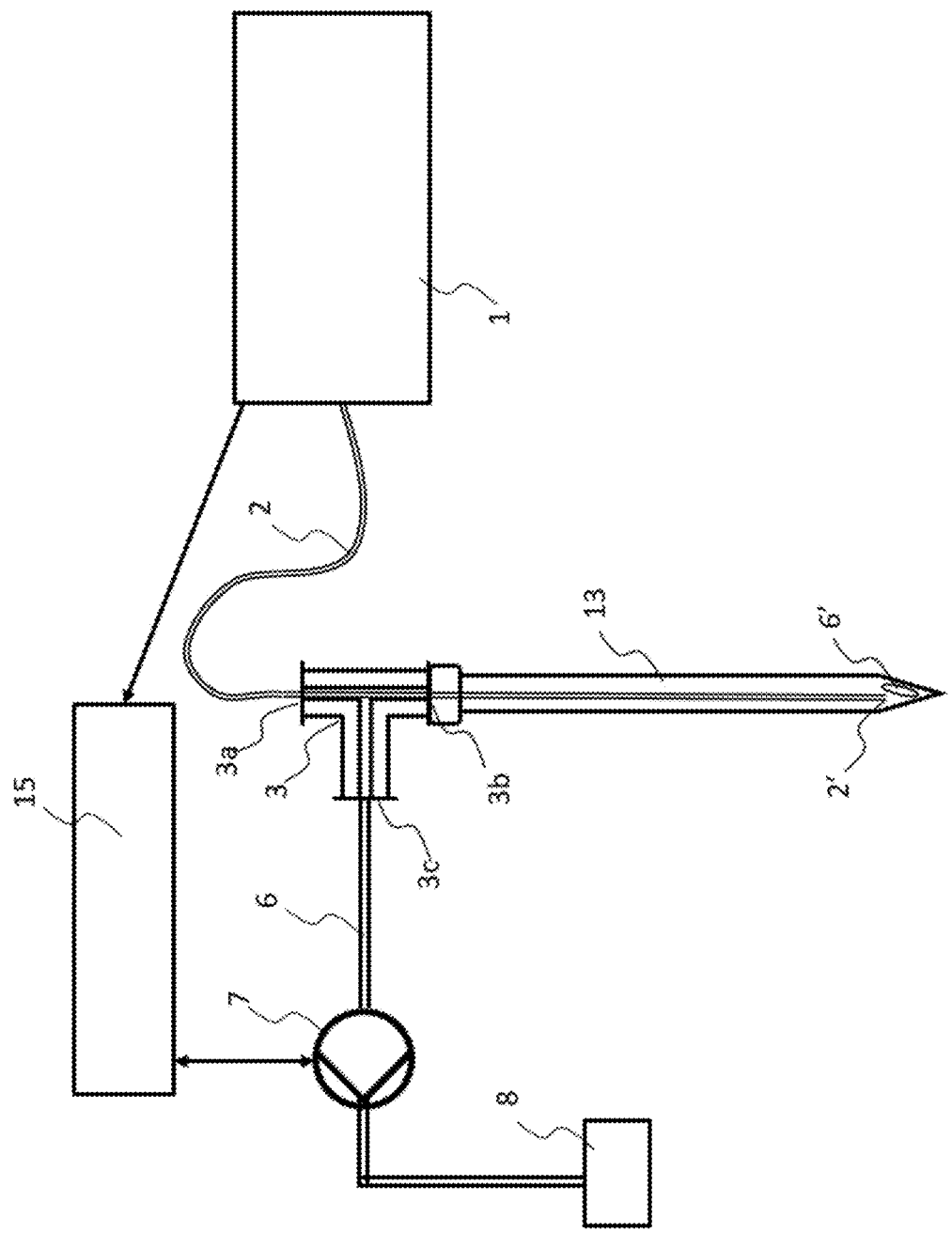
FIG. 1 shows a schematic illustration of the core of a first, simple embodiment of the fraction collection apparatus according to the invention, comprising a fluid pump in the fluid line and a common end section of the fluid line and capillary with communicating outlet openings.

This geometric configuration of the outlet openings 2', 6', as proposed in the present invention, can easily be seen in the embodiment of FIG. 1, which has been kept relatively simple. Here, the fluid line 6 and the capillary 2 extend in parallel from a flow point of view along a common section and extend in spatially concentric fashion. On one side, the common section of capillary 2 and fluid line 6 extends into the branching unit 3 and, at its other end, said common section opens into a cannula 13 on the side facing the target vessel 5 of the collection arrangement 4. The embodiment of the invention illustrated here moreover has the peculiarity of the branching unit 3 comprising a distributor piece (a T-piece in this case) with three inlet openings 3a, 3b, 3c. A first segment of the capillary 2 comes from the separation or reaction apparatus 1 opening into the first inlet opening 3a; a second segment leads to the collection arrangement 4 and consists of a part of respectively the fluid line 6 and the capillary 2 opening into the second inlet opening 3b; and a section of the fluid line 6 leads to the fluid pump 7 opening into the third inlet opening 3c. Finally, a control apparatus 15 is also present, and is configured and arranged to drive the fluid pump 7 electronically, and to subject the duration of the on and off cycles and the flow rate v1 to closed-loop control, with a switch from aspiration operation to pressure operation.

FIGS. 2A to 3B illustrate systems with in each case a particular embodiment of the fraction collection apparatus according to the invention and a conventional separation or reaction apparatus 1 in different operating states.

If the fluid pump 7 is at a standstill—as shown in FIG. 2A—the liquid fraction taken by the capillary 2 drips into the target vessel 5, provided therefor, at the transfer point for further processing.

Once dispensing of the fraction has been completed, the fluid pump 7—as shown in FIG. 2B—aspirates at an approximately 1% higher flow rate than the delivery pump 14 in the separation or reaction apparatus 1. As a result, the drop of liquid fraction arising at the needle tip of the cannula 13 at the end of the capillary 2 is aspirated into the outlet opening 6' of the fluid line 6 and transferred by the latter into the waste collection vessel 8. Dispensing the fraction into the collection arrangement 4 therefore stops immediately and without a time delay, and so uncontrolled dripping of parts of the liquid onto the collection arrangement 4 is reliably avoided.

Then, the needle tip of the cannula 13 is moved safely to the next vessel position, which is advantageously positioned in directly adjacent fashion; as a rule, this requires less than 1 s. If the fluid pump 7 is stopped again, then the next fractioning begins ad hoc without further time delay and without back mixing with a preceding fraction.

The fraction drawn during the position change is output again into the next target vessel 5 in the new position (added to the current fraction) where necessary, most easily by switching the fluid pump 7 to dispense, and hence 100% loss-free fractions are obtained.

As a result of this simple structure, any available XYZ fraction collector can be converted into a dead volume-free fraction collector by merely replacing the cannula 13 and adapting the employed control software. The general fraction collector function may possibly be slightly restricted as a result of the internal volume conditions of the dual cannula now used, but it continues to be present.

FIG. 3A shows an embodiment in which a first switching valve 9, in this case in the form of a 3/2-way valve, is disposed in the fluid line 6 between the fluid pump 7 and the waste collection vessel 8, an inlet opening of said first switching valve being connected to the fluid pump 7. By way of outlet openings of said first switching valve, the fluid pump 7 can be selectively connected to the waste collection vessel 8 or to a container 10 with system liquid, in particular for priming and/or for preparing liquid samples. In this way, it is possible to select between waste for aspirated fractions and the rinsing of the system, and actions for "normal" sample preparation.

FIG. 3B illustrates a more specific embodiment: a further switching valve 11 is disposed in the fluid line 6 between the fluid pump 7 and the branching unit 3, an inlet opening of said further switching valve being connected to the branching unit 3 and the branching unit 3 being able to be selectively connected to the fluid pump 7 or to a gas container 12 with gas, preferably dry inert gas, in particular for blowing clear, purging and/or drying lines and liquid fractions of the liquid collection apparatus collected in target vessels, via the outlet openings of said further switching valve.

This facilitates active evaporation and increased concentration of the liquid fraction. In this way, a definable, selectable volume of the fraction is obtained. This embodiment of the invention is advantageous for NMR measurements, in particular, since the chromatographic step can be carried out using a protonated solvent, which is then evaporated. The residue can subsequently be taken up again with a defined amount of a deuterated solvent. Deuterated solvents are substantially more expensive than protonated solvents and are therefore used very economically and only if absolutely necessary.

The gas is additionally heated, increasing the evaporation rate, if at least parts of the cannula 13 are heated, for example using an electric resistor. A triple channel cannula with an additional separate gas line is an additional optional embodiment, in which chromatography, fraction collector and gas line extend separately and parallel to a common tip. As a result, the further switching valve 11 between the fluid pump 7 and the branching unit 3 is no longer required.

Figure 5:
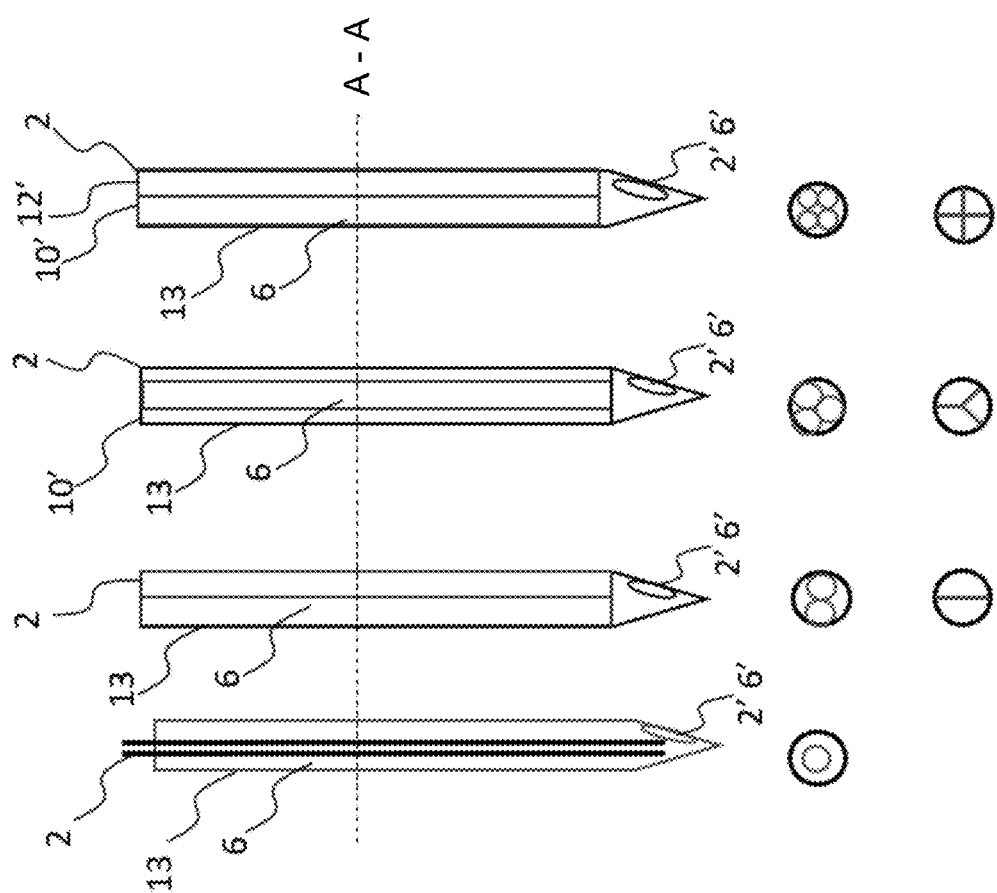
FIG. 5 shows a schematic illustration of (top) differently designed end sections, collectively embodied as cannulas, of capillary and fluid line and (bottom) various cross-sections A-A of the respective cannulas imaged thereabove.

FIG. 5 shows differently designed embodiments of the respective common end section of the fluid line 6 and capillary 2 with their communicating outlet openings, in the form of cannulas 13 that taper to a tip in needle-shaped fashion. Illustrated therebelow are different cross sections A-A transverse to the longitudinal axis of the respective cannula 13 imaged thereabove. The bottom row shows embodiments of the cannulas with subdivisions in the line itself, while the row second from the bottom in each case shows the line guidance with parallel tubes or pipes.

If a multiple cannula is used instead of a simple dual cannula, which likewise has a needle with an angled tip and venting at the end, the fraction collection can also be undertaken in vessels sealed by a septum. Cannulas made of concentrically disposed feed and discharge lines are currently shown. However, a parallel arrangement of fluid line 6 and capillary 2 in the cannula 13, inter alia, is also possible, with the openings 2', 6' then opening next one another into the needle tip. The fraction collector function for preparations is not influenced thereby; i.e., the aspiration by the fluid pump 7 works equally well in both variants without drips falling from the cannula tip. Naturally, the dimension of the cannulas has to be considered because drop-free aspiration would no longer work reliably in the case of an interior cannula cross section that is too large or in the case of an elution agent with a very low surface tension. Preferably, the outer capillary has an internal diameter of 0.7 mm to 2.5 mm and the inner capillary, which contains the sample to be fractionated, has an external diameter of 0.3 mm to 2 mm. In the case of a dual channel cannula, the preferred internal channel dimension lies between 0.5 mm and 2 mm, wherein the channel provided for aspiration may ideally have a slightly larger dimension than the channel guiding the liquid fraction. The aspirating channel should at least have dimensions that are suitable for aspiration at the envisaged flow rate (e.g., >0.5 mm ID Ø in the case of flow rates <1 ml/min).

In the case of a four-channel cannula, as shown furthest on the right in FIG. 5, the fourth channel is provided for a deuterated solvent, with which an evaporated sample, for example, is solubilized again with a defined volume. This is because experience has shown that pumps for protonated and deuterated solutions must be strictly separated since a 99.999% solvent exchange can only be carried out with very large amounts of solvent. This rinsing consumption should be avoided in any case for the relatively expensive deuterated solvents for reasons of costs and time.

Figure 6:
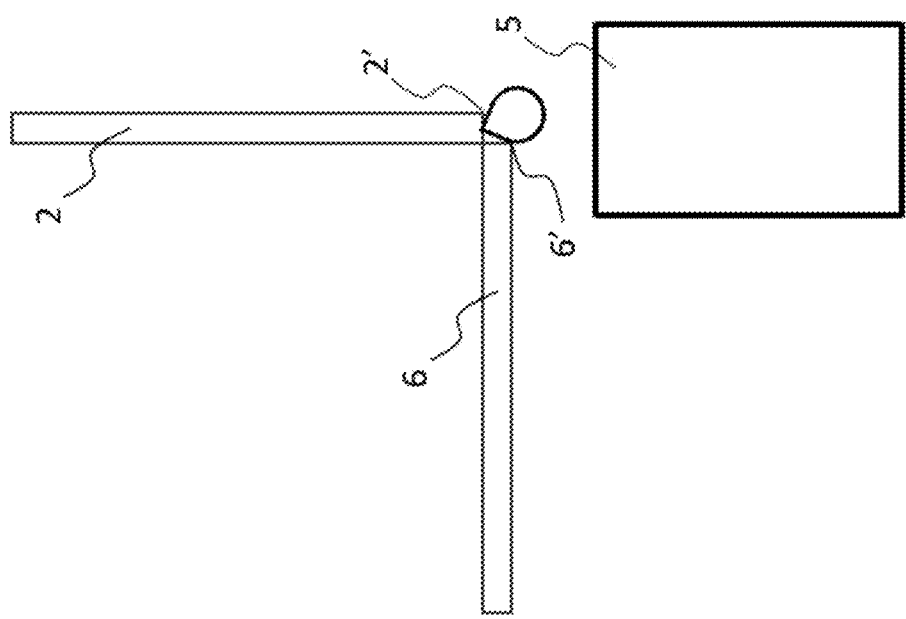
FIG. 6 shows a specific embodiment of the common end section of the fluid line and capillary with its communicating outlet openings, the fluid line being guided to the capillary from the side.

FIG. 6 shows—very schematically—a specific embodiment of the common end section of the fluid line 6 and capillary 2 with their communicating outlet openings 2', 6', in which the fluid line 6 is guided to the capillary 2 from the side. Although this geometry differs fundamentally from the parallel, in particular concentric configurations presented above—for instance illustrated in FIG. 5—it equally meets the basic demand according to the invention, according to which the outlet openings 2', 6' are disposed in the direct vicinity of one another such that liquid emerging from the outlet opening 2' of the capillary 2 transitions into the outlet opening 6' of the fluid line 6.

Figure 7:
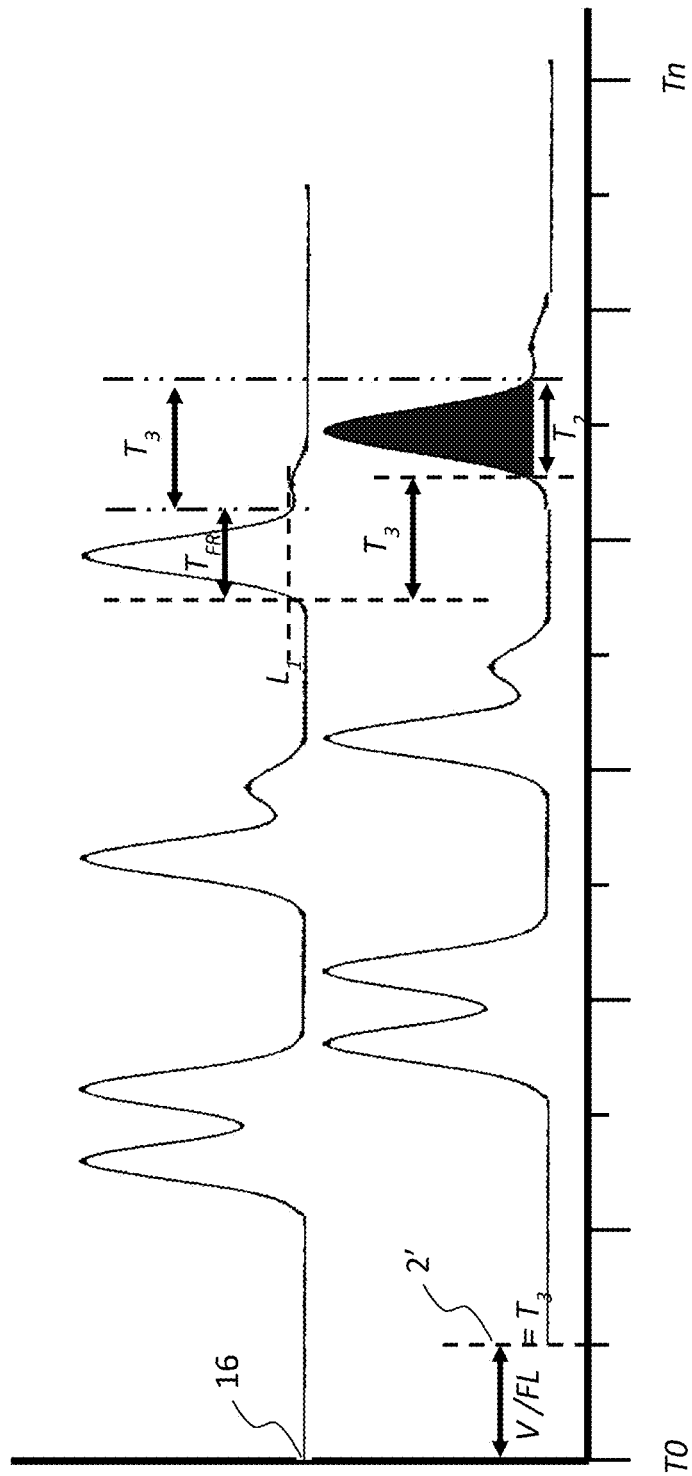
FIG. 7 shows a typical schematic time curve during the detection of a liquid fraction taken with the capillary.

FIG. 7 illustrates a typical schematic time curve when detecting a liquid fraction taken with the capillary 2.

It is possible to identify the relationships of the following physical variables:

FL=Flow rate (µl/s)
$L_1$=Detection level for recording a liquid fraction (mV) in a defined time window
$T_3$=Time delay from the detector 16 to the outlet opening 2' of the capillary 2 → volume/flow rate=µl/(µl/s)
$T_{FR}$=Time for recording a liquid fraction (s) → $T_{FR} \times FL = V_{Fr}$
$S_1$=Start of the fraction
$S_2$=end of the fraction
V=Internal volume (µl) from the detector 16 to the outlet opening 2'
$V_{Fr}$=Volume of the liquid fraction (µl).

The upper line in FIG. 7 represents the time curve in the detector and the lower line is the time-offset arrival of the detected eluate at the outlet opening 2'. The time offset is easily determinable automatically by virtue of the known internal volume V being divided by the flow rate FL, which is set by the control apparatus.

If the sought-after fraction passes the detector 16 during the period of time $T_{FR}$, the fraction can be captured precisely at the time offset $T_3$, as illustrated in the drawing by the black area.

Figure 8:
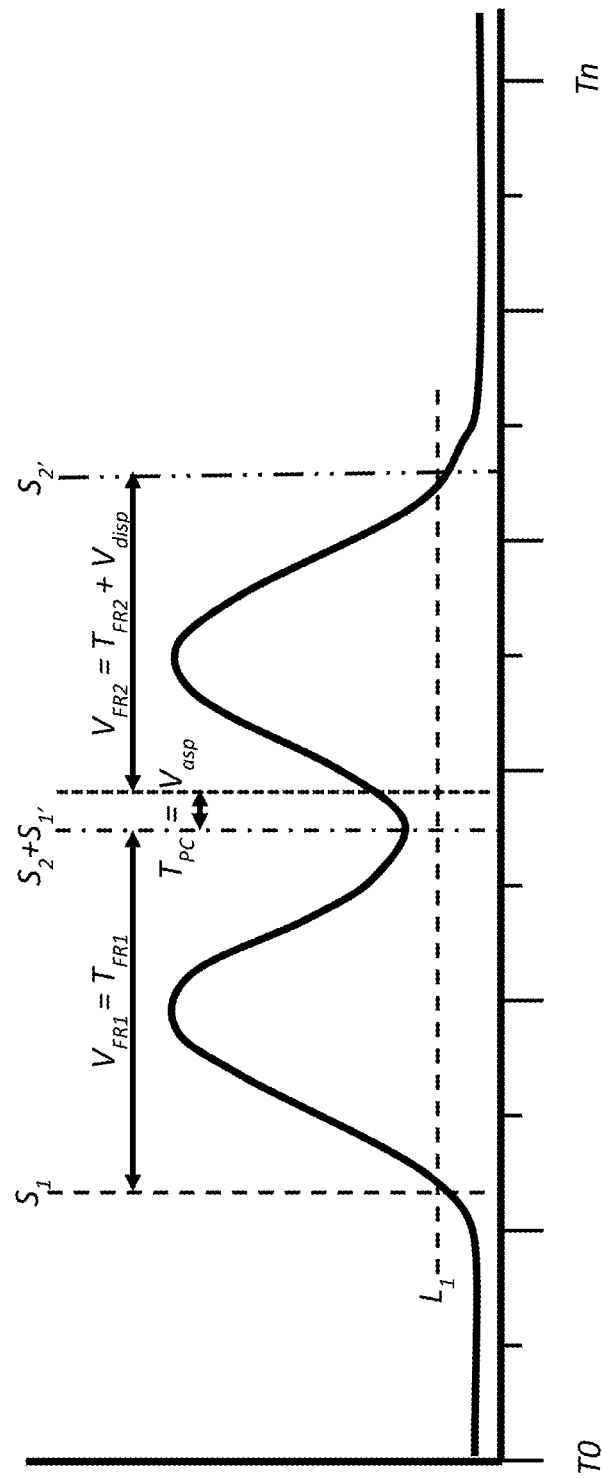
FIG. 8 shows the temporal separation of two liquid fractions that immediately follow one another in time.

Finally, FIG. 8 illustrates the (temporal and hence also spatial) separation of two liquid fractions that immediately follow one another in time. Here, the following variables are of importance:
$L_1$=Detection level for recording a liquid fraction (mV) in a defined time window $S_1$=Start of fraction 1
$S_1'$=End of fraction 1
$S_2$=Start of fraction 2
$S_2'$=End of fraction 2
$T_{FR1}$=Time for recording a liquid fraction 1
$T_{FR2}$=Time for recording a liquid fraction 2
$T_{PC}$=time for a mechanical change in position to a new target vessel 5
$V_{FR1}$=Volume of the liquid fraction 1
$V_{FR2}$=Volume of the liquid fraction 2
$V_{asp}$=Volume of the aspirated liquid fraction during the change in position ($V_{asp}=V_{disp}$)
$V_{disp}$=Volume of the aspirated liquid fraction that is output following the change in position.

The figure illustrates the goal of sharply separating the two fractions 1 and 2, which directly follow one another. To this end, it is necessary to work without a dead volume and to know the precise volume V. Then, fraction 1 is captured in a first target vessel 1 only during the period of time $T_{FR1}$. Once the detector 16 identifies a drop in the peak, which is directly correlated to the concentration of the target molecule in fraction 1, the fluid pump 7 is activated such that no mixed fraction drops into the first target fraction. While the fluid pump 7 aspirates the eluate during the period of time $T_{PC}$, the fraction collector changes the target vessel 5 in order to collect fraction 2. Here, the control apparatus 15 can deactivate the pump 7 once the detector 16 detects a significant increase in the concentration in fraction 2. This type of procedure using the fraction collection apparatus according to the invention allows fractions that lie close together to be collected in a sharply separated manner. The time offset from the detector 16 to the outlet opening 2' is captured as mentioned in FIG. 7.

LIST OF REFERENCE SIGNS

1 Separation or reaction apparatus
2 Capillary
2' Outlet opening of the capillary
3 Branching unit
3a First inlet opening
3b Second inlet opening
3c Third inlet opening
4 Collection arrangement
5, 5' Target vessel(s)
6 Fluid line
6' Outlet opening of the fluid line
7 Fluid pump
8 Waste collection vessel
9 First switching valve
10 Container with system liquid
11 Further switching valve
12 Gas container
13 Cannula
14 Delivery pump
15 Control apparatus
16 Detector
17 Valve
A-A Horizontal section through the cannulas

LIST OF CITATIONS

Publications considered for the assessment of the patentability:
[0] US 2005/0158215 A1
[1] Handbuch, "Foxy® R1 and Foxy® R2, Fraction Collectors", Teledyne Isco, Revision H, 21 Jun. 2016

[2] US 2002/0011276 A1
[3] US 2002/0088946 A1
[4] U.S. Pat. No. 6,704,880 A
[5] US 2018/0136174 A1

What is claimed is:

1. A fraction collection apparatus for collecting sequential liquid fractions from a separation or reaction apparatus, comprising:
 a branching unit,
 a capillary arranged and configured to guide the liquid fractions from the separation or reaction apparatus to the branching unit,
 a collection arrangement carrying a plurality of target vessels configured and arranged to receive the liquid fractions from the capillary, and
 a fluid line flow-connected to a fluid pump,
 wherein the fluid line opens into the branching unit,
 wherein the capillary and the fluid line each have a respective outlet opening facing the target vessels and arranged to receive the liquid fractions,
 wherein the capillary outlet opening and the fluid line outlet opening are disposed in a direct vicinity of one another such that liquid emerging from the capillary outlet opening transitions into the fluid line outlet opening to form a common section with an end section,
 wherein the end section of the common section faces the target vessels and opens into a cannula, and
 wherein the fluid pump is configured to switch or is operable to be switched from pumping to aspirating the liquid fractions.

2. The fraction collection apparatus as claimed in claim 1, wherein the fluid line and the capillary extend in parallel from a flow point of view along a common section.

3. The fraction collection apparatus as claimed in claim 2, wherein the fluid line and the capillary extend concentrically from the flow point of view along the common section.

4. The fraction collection apparatus as claimed in claim 2, wherein the fluid line extends into the branching unit.

5. The fraction collection apparatus as claimed in claim 1, wherein the branching unit comprises a distributor piece with at least three inlet openings, a first segment of the capillary coming from the separation or reaction apparatus opening into the first inlet opening, a second segment leading to the collection arrangement and consisting of the fluid line and the capillary opening into the second inlet opening and a section of the fluid line leading to the fluid pump opening into the third inlet opening.

6. The fraction collection apparatus as claimed in claim 1,
 wherein the capillary sequentially guides the plurality of liquid fractions from the separation or reaction apparatus,
 wherein the collection arrangement carries the plurality of target vessels arranged in an XY or an XYZ arrangement and configured to receive the plurality of liquid fractions individually and sequentially,
 further comprising a control apparatus configured to cooperatively control the capillary and the collection arrangement to deposit the plurality of liquid fractions respectively in the plurality of target vessels.

7. A fraction collection apparatus for collecting sequential liquid fractions from a separation or reaction apparatus, comprising:
 a branching unit,
 a capillary arranged and configured to guide the liquid fractions from the separation or reaction apparatus to the branching unit,
 a collection arrangement carrying a plurality of target vessels configured and arranged to receive the liquid fractions from the capillary, and
 a fluid line flow-connected to a fluid pump,
 wherein the fluid line opens into the branching unit,
 wherein the capillary and the fluid line each have a respective outlet opening facing the target vessels and arranged to receive the liquid fractions,
 wherein the capillary outlet opening and the fluid line outlet opening are disposed in a direct vicinity of one another such that liquid emerging from the capillary outlet opening transitions into the fluid line outlet opening to form a common section with an end section,
 wherein the end section of the common section faces the target vessels and opens into a cannula
 a waste collection vessel for collecting discarded ones of the plurality of liquid fractions guided out of the branching unit via the fluid line for disposal purposes, and
 a first switching valve disposed in the fluid line between the fluid pump and the waste collection vessel, wherein an inlet opening of the first switching valve is connected to the fluid pump and wherein outlet openings of the fluid pump are configured to be selectively connected to the waste collection vessel or to a system liquid container via the outlet openings of the first switching valve.

8. The fraction collection apparatus as claimed in claim 7, wherein the first switching valve is a 3/2-way valve.

9. The fraction collection apparatus as claimed in claim 7, wherein the system liquid container is configured for rinsing and/or for preparing contained liquid samples.

10. The fraction collection apparatus as claimed in claim 7, further comprising a further switching valve disposed in the fluid line between the fluid pump and the branching unit, wherein an inlet opening of the further switching valve is connected to the branching unit and wherein outlet openings of the branching unit are configured to be selectively connected to the fluid pump or to a gas container via the outlet openings of the further switching valve.

11. The fraction collection apparatus as claimed in claim 10, wherein the further switching valve is a 3/2-way valve, and wherein the gas container contains dry inert gas.

12. The fraction collection apparatus as claimed in claim 10, further comprising lines and/or cavities, wherein the gas container is configured to blow clear, purge and/or dry the lines and/or cavities via the outlet openings of the further switching valve.

13. The fraction collection apparatus as claimed in claim 1, further comprising a delivery pump disposed at the separation or reaction apparatus and configured to convey the liquid in the capillary at a capillary flow rate v2.

14. A fraction collection apparatus for collecting sequential liquid fractions from a separation or reaction apparatus, comprising:
 a branching unit,
 a capillary arranged and configured to guide the liquid fractions from the separation or reaction apparatus to the branching unit,
 a collection arrangement carrying a plurality of target vessels configured and arranged to receive the liquid fractions from the capillary, and
 a fluid line flow-connected to a fluid pump, and
 a delivery pump disposed at the separation or reaction apparatus and configured to convey the liquid in the capillary at a capillary flow rate v2,
 wherein the fluid line opens into the branching unit, wherein the capillary and the fluid line each have a respective outlet opening facing the target vessels and arranged to receive the liquid fractions, wherein the capillary outlet opening and the fluid line outlet opening are disposed in a direct vicinity of one another such that liquid emerging from the capillary outlet opening transitions into the fluid line outlet opening to form a common section with an end section, and wherein the end section of the common section faces the target vessels and opens into a cannula wherein the fluid pump is subject to closed-loop control such that a fluid line flow rate v1 in the fluid line is at least equal to the capillary flow rate v2 in the capillary.

15. The fraction collection apparatus as claimed in claim 14, further comprising a control apparatus configured to drive the fluid pump electronically, wherein a duration of on-and-off cycles and the fluid line flow rate v1 are subject to the closed-loop control.

16. The fraction collection apparatus as claimed in claim 15, further comprising a switch to set the fraction collection apparatus between an aspiration operation and a pressure operation.

17. The fraction collection apparatus as claimed in claim 1, wherein the separation or reaction apparatus comprises a liquid chromatography device with a separation column and a detector, and wherein the liquid fraction is an eluate fraction.

18. A system comprising
   a separation or reaction apparatus, and
   a fraction collection apparatus for collecting liquid fractions from the separation or reaction apparatus as claimed in claim 1.

19. The system as claimed in claim 18, wherein the separation or reaction apparatus is a liquid chromatography device with a separation column.

20. A method for operating a fraction collection apparatus as claimed in claim 1, comprising:
   a) supplying a first of the liquid fractions via the capillary at a known flow rate v2,
   b) positioning the cannula over and/or in a first of the plurality of target vessels with simultaneous aspiration with the fluid pump through the fluid line,
   c) stopping the fluid pump and collecting the first liquid fraction in the first target vessel over a period of time T1,
   d) starting the fluid pump and aspirating the liquid fraction into the fluid line for changing the positioning of the cannula into a subsequent target vessel over a further period of time T2,
   e) repeating said steps c) and d) for further liquid fractions and further target vessels until terminating the method.

21. The method as claimed in claim 20, wherein said step e) comprises:
   c1) in a pressure operation of the fluid pump, releasing the partial fraction aspirated in said step d) to the target vessel.

22. The method as claimed in claim 20, wherein the separation or reaction apparatus is a liquid chromatography device with a separation column and a downstream detector, wherein a volume V in the capillary between the detector and the end section of the capillary facing the one target vessel of the collection arrangement is known, and wherein said step e) further comprises stopping the fluid pump as per said step c) with a time offset by a period of time T3, wherein T3 is the time during which the eluate passes the volume V.

* * * * *